United States Patent
Akuta Tomohiko et al.

[15] 3,670,833
[45] June 20, 1972

[54] METHOD FOR MEASURING A WEIGHING LOAD RAPIDLY

[72] Inventors: Akuta Tomohiko; Atsumi Seya; Shinya Hashirizaki, all of Kitakyushu, Japan

[73] Assignees: Yawata Iron & Steel Co., Ltd.; Mitsubishi Seiko Kabushiki Kaisha, Tokyo, Japan

[22] Filed: Aug. 25, 1970

[21] Appl. No.: 66,707

[52] U.S. Cl. .................................. 177/1, 177/210, 328/165
[51] Int. Cl. ............................................................ G01g 3/14
[58] Field of Search ....................... 177/163, 185, 210, 211, 1; 323/122; 324/125; 328/165

[56] References Cited

UNITED STATES PATENTS

| | | | |
|---|---|---|---|
| 2,914,310 | 11/1959 | Bahrs | 177/185 X |
| 3,063,635 | 11/1962 | Gordon | 177/163 X |
| 3,276,525 | 10/1966 | Cass | 177/210 X |
| 3,446,298 | 5/1969 | Cory et al. | 177/163 X |
| 3,478,830 | 11/1969 | Levesque et al. | 177/210 X |
| 3,545,555 | 12/1970 | Cass | 177/210 X |

Primary Examiner—Richard B. Wilkinson
Assistant Examiner—George H. Miller, Jr.
Attorney—Robert E. Burns and Emmanuel J. Lobato

[57] ABSTRACT

Where a weighing load is detected as an electrical weighing signal with an oscillatory component due to various oscillations of the weighing elements, the oscillatory component is separated from the original weighing signal and after it is positively inverted in phase, the inverted separated signal is superposed on the original signal so that the weighing signal is obtained, with the oscillatory signal eliminated.

12 Claims, 9 Drawing Figures

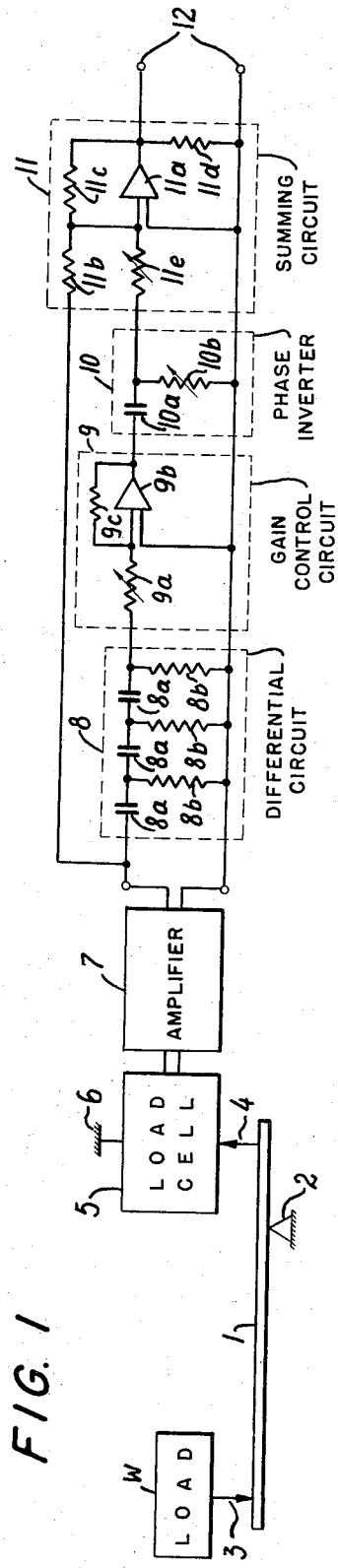
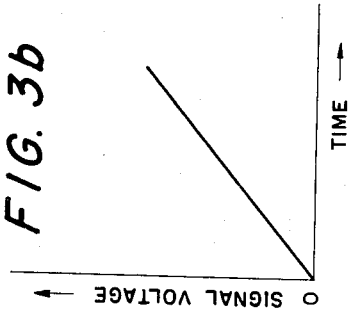
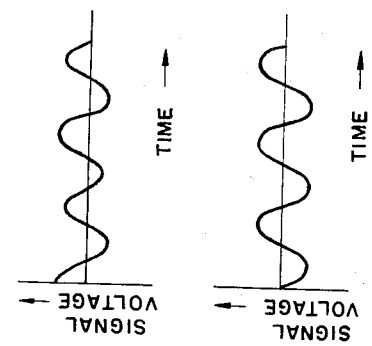
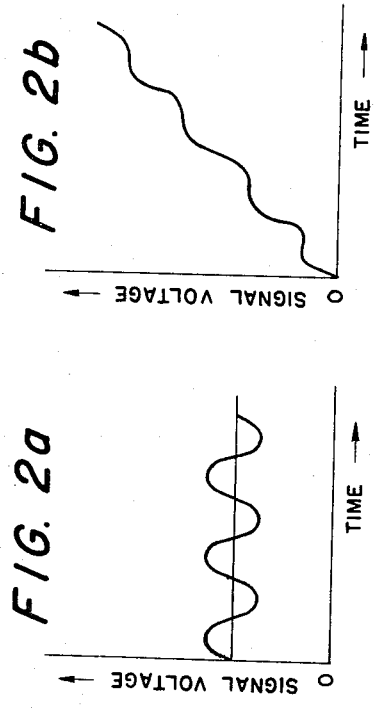

METHOD FOR MEASURING A WEIGHING LOAD RAPIDLY

BACKGROUND OF THE INVENTION

This invention relates to a method for measuring a weighing load rapidly wherein the load is detected as an electrical weighing signal, and more particularly to a method for measuring rapidly only a pure electrical weighing value by eliminating from it any oscillatory component contained in it due to various oscillations.

A general tendency of weighing machines using a lever system is that even with the slightest deflection occurring in the machine during the weighing operation, a force proportional to the deflection acts to restore it, as a result of which there are produced oscillations in the lever system.

Since the period of such oscillations has a proportional relation with the sensitiveness of the weighing machine, it becomes larger if the sensitiveness of the weighing machine is increased and thus the efficiency of the machine deteriorates.

Accordingly, in known weighing machines, it has been unavoidable either to increase sensitiveness at the sacrifice of the efficiency or to increase the efficiency at the sacrifice of the sensitiveness.

It has been proposed to correct such defects by eliminating the oscillatory components from the detected output signal with filters, but there still remains a problem in practical use because it involves a delay in the weighing operation.

SUMMARY OF THE INVENTION

It is a primary object of the invention to provide a method for measuring a weighing load without delay, yet with a high sensitiveness, regardless of the period of the oscillation.

To achieve this object, the method according to the present invention comprises the steps of separating the oscillatory component signal from the original electrical weighing signal detected along with the oscillatory component, positively reversing the phase of said separated oscillatory component signal, synchronously superposing said original electrical weighing signal and said reversed phase oscillatory component signal on each other and thereby eliminating the oscillatory component so as to obtain the weighing signal alone.

BRIEF DESCRIPTION OF THE DRAWINGS

These and other objects of the present invention will become more apparent to those skilled in the art when considered in reference to the following description in the light of the accompanying drawings wherein:

FIG. 1 is a circuit diagram of a system for practicing the method according to the present invention;

FIG. 2 (a) is a signal wave curve at the output end of a weighing machine with a constant load;

FIG. 2 (b) is a curve similar to FIG. 2 (a) but with a gradually increasing load;

FIG. 3 (a) is an oscillatory wave curve extracted from the signal shown in FIG. 2 (a);

FIG. 3 (b) is a curve extracted from the signal shown in FIG. 2. (b) and showing only the load signal;

FIG. 4 is a curve directly reversing the extracted wave shown in FIG. 3 (a) in order to eliminate the oscillatory waves involved in the wave shown in FIG. 2 (a) or 2 (b);

DESCRIPTION OF THE PREFERRED EMBODIMENT

Figure 5:
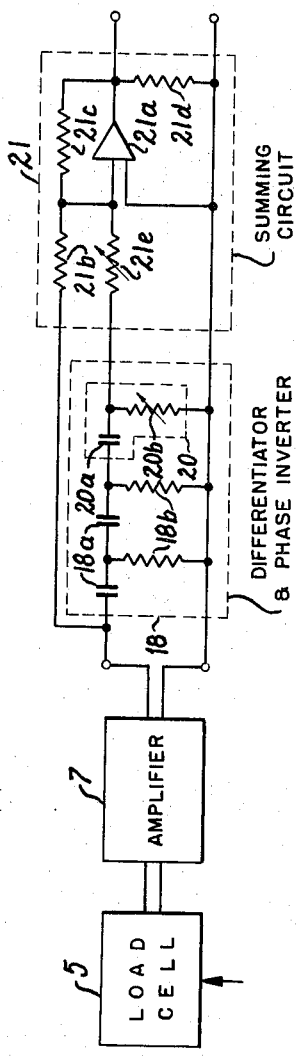
FIG. 5 is an alternative oscillatory wave eliminating circuit for a variable load.

Referring to FIG. 1 of the drawing, there is shown a weighing machine which comprises a lever system shown as a lever 1, having a fulcrum 2, a loading point 3 and a point of force application 4. A load W applied to the loading point 3 exerts a force upon a load cell 5 such as a strain gauge or a differential transformer or other transducer disposed between the point of force application 4 and a fixed support 6 so that the load applied is converted into a corresponding electrical output.

In such a weighing machine, the load W applied on the loading point 3 is transmitted to the point of force application 4 with its value decreased or increased depending upon the lever ratio of the distance between the fulcrum 2 and the loading point 3 to that between the fulcrum 2 and the point of force application 4, so that the correspondingly reduced or increased force is applied to the load cell 5 to produce a corresponding electrical output. The output of the load cell is taken out as a terminal voltage amplified by an amplifier 7. The terminal voltage is shown by a voltage-time characteristic curve, FIG. 2 (a) showing the curve when the load W is constant, while FIG. 2(b) shows the curve when the load W gradually increases. Both curves show a D.C. voltage corresponding to the load W modified by an A.C. voltage representing the vibration of the lever system.

The output of the load cell 5 amplified by the amplifier 7 is applied to a differential circuit 8 comprising, e.g. condensers 8a and resistors or inductances 8b, and simultaneously to a summing circuit 11 in parallel. The differential circuit 8 eliminates the D.C. voltage component representing the load W and transmits only the A.C. voltage component representing the vibration of the lever system.

Since the vibration of the lever system usually has a sine waveform, the A.C. voltage representing it also has a sine waveform, and therefore its differential value has a sine waveform, also. The output of the differential circuit 8 is hence a sine waveform as shown in FIG. 3(a) which represents only the oscillatory component of the lever system. The output of the differential circuit 8 is then applied to a gain control circuit 9 so that the sine wave signal of the oscillatory portion, which has been decreased in the differential circuit 8, is amplified so as to have the same amplitude as the sine wave component of the output of the amplifier 7.

The gain control circuit 9 is shown as comprising a variable resistor 9a and an amplifier 9b shunted by a resistor 9c. The amplifier is selected to have good linearity and drift characteristics.

The sine wave signal thus amplified by the gain control circuit 9 so as to have the same amplitude as the sine wave component of the output of the amplifier 7 is fed to a phase inverting circuit 10 and is shifted in phase by exactly 180° from that of the sine wave signal in the vibration component of the output of amplifier 7.

The phase inverting circuit 10 is shown as comprising a condenser 10a and a variable resistor 10b. The sine wave signal inverted in phase as shown in FIG. 4 is applied to the summing circuit 11, which is shown as comprising an amplifier 11a, resistors 11b, 11c and 11d and a variable resistor 11e. Since the signal from the output of amplifier 7 to the differential circuit 8 is also applied directly to the summing circuit 11 synchronously with the vibration portion signal inverted in phase as aforesaid, the vibration portion signals are mutually cancelled so that only the D.C. signal representing the load W and containing no oscillatory portion is taken out from the summing circuit 11. Accordingly, when the D.C. signal is calibrated in terms of weight, the load W can be weighed without any effect of vibration in the lever system.

The method described above is for the case where the load is constant. Next, the method for weighing a variable load, e.g. a gradually increasing load, will be explained.

When a load varies with time, e.g. the weighed value itself is a signal having velocity or acceleration, the oscillatory portion is taken out by a multiple differential circuit and subjected to a phase inversion, so that the varying load is weighed with its oscillatory portion eliminated in the same manner as before.

FIG. 5 shows a weighing circuit for weighing a variable load wherein the load cell 5 and amplifier 7 are the same as in FIG. 1.

The output of the amplifier 7 is branched into two circuits, one to a triple differential circuit 18 and the other directly to a summing circuit 21. The triple differential circuit 18 has combined functions of the differential circuit 8 and the phase inverting circuit 10 in FIG. 1, and is shown as comprising a phase inverting circuit 20 connected in series with differential circuits each composed of a condenser 18a, and a resistor 18b.

The phase inverting circuit 20 is shown as comprising a condenser 20a and a variable resistor 20b. From the triple differential circuit 18, the phase shifted oscillatory signal is fed to a circuit 21 which has the combined functions of the gain control circuit 9 and the summing circuit 11 in FIG. 1. It is shown as comprising an amplifier 21a, resistors 21b, 21c and 21d and a variable resistor 21e. When a signal of the kind shown in FIg. 2(b) is applied to the circuit, the A.C. component ( sine wave form ) is separated and shifted 180° in phase by the triple differential circuit 18 to provide an output as shown in FIG. 4. This output is adjusted in amplitude by the variable resistor 21e and summed with the original signal fed directly to the summing circuit 21 so that both oscillatory portion voltages are eliminated. Hence only the weighing signal as shown in FIG. 3(b) is taken out to obtain the weighing value.

As in a crane scale, where an output signal of the load cell includes combined vibration portions from ropes, hangers and lever systems, and, for example, molten steel discharged from or remaining in a molten steel containing vessel hung from from the crane is continuously weighed while pouring out the molten steel from the vessel, the weight signal of the output of the load cell is often combined with more than two oscillatory portions as shown in FIG. 2(b).

In such a case, the combined oscillatory portions are perfectly eliminated by repetition of the method described above.

Figure 6:
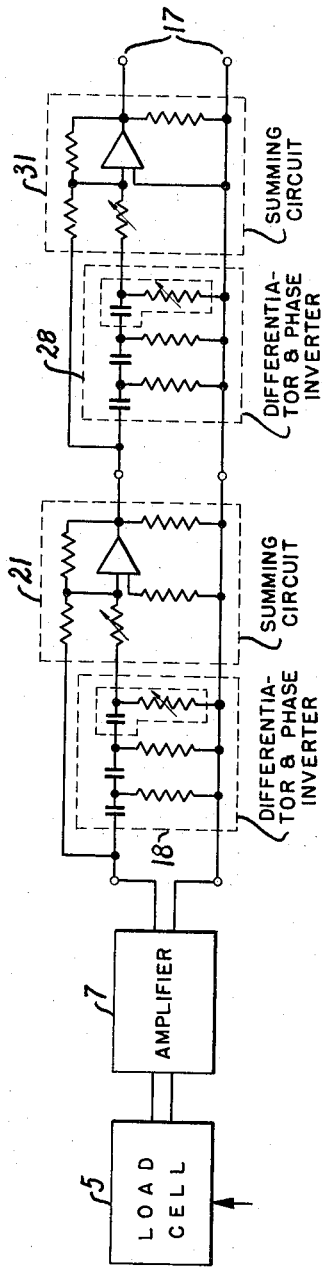
FIG. 6 is an oscillatory wave eliminating circuit for a case where the oscillatory signal is composed of more than two components.

FIG. 6 shows an example of the above method and illustrates that the oscillatory portions can be eliminated by differentiation, phase inversion and synchronous summing, and the weighing portion alone can thus be obtained.

In other words, in such a case, the oscillatory portions are successively eliminated by applying them to two or more series-connected oscillatory portion eliminating circuits of the kind shown in FIG. 5. The output of the amplifier 7 is branched into two circuits shown in FIG. 6 of which one circuit comprises a differential and phase inverter circuit 18, to produce only a signal of the oscillatory portion with its phase inverted. The inverted signal thus obtained is synchronously supplied to a summing circuit 31 along with the other branched portion of the original signal so as to eliminate the first oscillatory portion. Then after again branching the processed signal into two circuits, one branched portion is supplied through a differential and phase inverter circuit 28, to a summing circuit 31 to be synchronously summed with the other branched portion, so that the second oscillatory portion is eliminated. Consequently, a weighing signal 17 is separately taken out so that quick and exact weighing is possible. Thus, the weighing signal only is derived from the oscillatory signal as shown in FIG. 3(b). In case the compound signal comprises more than three components, the elimination of oscillatory components can be performed by repeating the eliminating methods any required number of times depending on the number of the components.

In this connection, it will be noted that in the first and the second component eliminating circuits, the differential circuits, gain control circuits and phase inverting circuits have identical functions respectively, while the circuit constants determining the frequencies and the amplitudes must be set so as to match the respective components to be eliminated.

Figure 7:
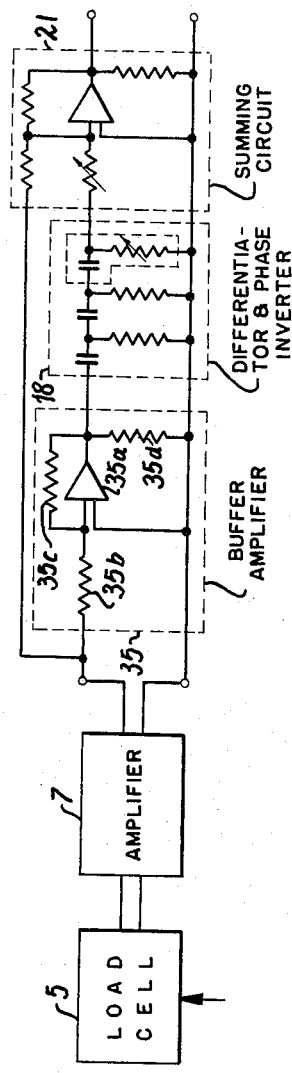
FIG. 7 is a circuit having a delay compensating circuit in a differential circuit for separating the oscillatory signal component from the output.

In the oscillatory components signal wave control circuits aforementioned, the differential circuits 8, 18 and 21 operate as delay elements for the input signal. This can be avoided by introducing a buffer amplifier 35 before the differential circuit as shown in FIG. 7.

The buffer amplifier 35 is shown as comprising an amplifier 35a and resistors 35b, 35c and 35d connected as shown. The remainder of the circuit is the same as in FIG. 5 and the components are identified in like manner. It will be understood that additional differential, phase inverting and summing circuits may be used as in FIG. 6.

In the circuits shown in FIG. 1 or FIG. 5 it is probable that an oscillation of a specific frequency occurs due to the existence of the differential circuit, but such an oscillation phenomenon can be suppressed by either connecting an integrator after the summing circuit 11 or by using an operational amplifier having both functions of adding and integrating in place of the summing circuit.

In this case, the introduction of the integrating circuit causes a delay in the original signal, but by selection of suitable constants the delay of the original signals can be made so small that it can be practically ignored.

What we claimed is:

1. A method for rapidly measuring a weighing load with superimposed vibrations, wherein said load is detected as an electrical weighing signal with an oscillatory component due to said vibrations comprising separating said oscillatory component signal from said original weighing signal, positively reversing the phase of said separated oscillatory signal with its period and amplitude made the same as those of the original oscillatory component and then superimposing said separated and phase-reversed oscillatory signal on said original weighing signal to cancel out the oscillatory component of said original weighing signal, thereby obtaining the weighing signal with no oscillatory component.

2. Apparatus for rapidly measuring a weighing load with superimposed vibrations, comprising means for detecting said load as an electrical weighing signal with an oscillatory component due to said vibrations, means for separating said oscillatory component signal from the original weighing signal, means for reversing the phase of said separated signal and for making its amplitude the same as that of the original oscillatory component signal and means for then superimposing said separated and phase-reversed oscillatory signal on said original weighing signal to eliminate the oscillatory component of said original weighing signal to obtain the weighing signal with no oscillatory component.

3. Apparatus according to claim 2, further comprising signal amplifying means connected between said detecting means and said means for separating said oscillatory component signal.

4. Apparatus according to claim 3, in which said means for separating said oscillatory component signal comprises a differential circuit which passes alternating current representing said oscillatory component signal but does not pass direct current representing the weight of the load being weighed.

5. Apparatus according to claim 4, in which said differential circuit comprises two lines connected to the output of said amplifier, at least one capacitor in one said line and at least one resistor connected across between said lines.

6. Apparatus according to claim 4, in which said means for reversing the phase of said separated signal and for making its amplitude the same as the original signal comprises a gain control circuit and a phase inverter connected in sequence.

7. Apparatus according to claim 6, in which said means for superimposing said separated oscillatory signal on the original weighing signal comprises a summing circuit having two inputs, one of which is connected directly to said amplifier and the other of which is connected to said amplifier through said differential circuit, gain control circuit and said phase inverter.

8. Apparatus according to claim 3, in which said means for separating said oscillatory signal and reversing the phase of said separated signal comprises a differentiator and phase inverter circuit connected to the output of said amplifier.

9. Apparatus according to claim 8, in which said differentiator and phase inverter circuit comprises two lines connected to the output of said amplifier, a plurality of capacitors connected in series in one of said lines and a plurality of resistors connected between said lines including resistors connected to said one line between said capacitors.

10. Apparatus according to claim 8, in which said means for making the amplitude of said separated signal the same as that of the original signal and for superimposing said separated signal on the original weighing signal comprises a summing circuit having two inputs of which one is directly connected to said amplifier and the other is connected to said amplifier through said differentiator and phase inverter circuit, said summing circuit including means for making the amplitude of said separated signal the same as that of the original signal.

11. Apparatus according to claim 10, comprising a plurality of units connected in sequence, each of said units comprising a said differentiator and phase inverter circuit and a said summing circuit, said units successively eliminating oscillatory components of different frequency.

12. Apparatus according to claim 10, comprising a buffer amplifier connected between said first mentioned amplifier and said differentiator and phase inverter circuit.

* * * * *